US007886093B1

(12) United States Patent  (10) Patent No.: US 7,886,093 B1
Chen  (45) Date of Patent: Feb. 8, 2011

(54) ELECTRONIC DEVICE NETWORK SUPPORTING COMPRESSION AND DECOMPRESSION IN ELECTRONIC DEVICES

(75) Inventor: Shao-Chun Chen, Aliso Viejo, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 727 days.

(21) Appl. No.: 10/903,394

(22) Filed: Jul. 30, 2004

Related U.S. Application Data

(60) Provisional application No. 60/491,831, filed on Jul. 31, 2003, provisional application No. 60/523,402, filed on Nov. 19, 2003.

(51) Int. Cl.
*G06F 13/12* (2006.01)
*G06F 13/38* (2006.01)

(52) U.S. Cl. .......................... 710/68; 709/247
(58) Field of Classification Search ............... 710/1–74
See application file for complete search history.

(56) References Cited

U.S. PATENT DOCUMENTS

| | | | |
|---|---|---|---|
| 5,084,816 A | 1/1992 | Boese et al. | |
| 5,261,055 A | 11/1993 | Moran et al. | 395/275 |
| 5,442,771 A | 8/1995 | Filepp et al. | 395/650 |
| 5,455,576 A * | 10/1995 | Clark et al. | 341/50 |
| 5,479,637 A | 12/1995 | Lisimaque et al. | 395/430 |
| 5,537,483 A * | 7/1996 | Stapleton et al. | 382/309 |
| 5,579,522 A | 11/1996 | Christeson et al. | 395/652 |
| 5,596,738 A | 1/1997 | Pope | 395/430 |
| 5,598,534 A | 1/1997 | Haas | 395/200.09 |
| 5,600,844 A * | 2/1997 | Shaw et al. | 715/500 |
| 5,608,910 A | 3/1997 | Shimakura | 395/670 |
| 5,623,604 A | 4/1997 | Russell et al. | 395/200.1 |
| 5,666,293 A | 9/1997 | Metz et al. | 395/200.5 |
| 5,699,548 A * | 12/1997 | Choudhury et al. | 711/142 |

(Continued)

FOREIGN PATENT DOCUMENTS

CA   2339923   3/2000

(Continued)

OTHER PUBLICATIONS

"Focus on OpenView A guide to Hewlett-Packard's Network and Systems Management Platform", Nathan J. Muller, pp. 1-291, CBM Books, published 1995.
"Client Server computing in mobile environments", J. Jing et al, ACM Computing Surveys, vol. 31, Issue 2, pp. 117-159, ACM Press, Jul. 1999.

(Continued)

*Primary Examiner*—Henry W Tsai
*Assistant Examiner*—Elias Mamo

(57) ABSTRACT

Disclosed herein is an electronic device network including a plurality of electronic devices. The electronic devices may each have update agents capable of selectively decompressing compressed code and/or compressed data segments. The update agents may also be adapted to employ the decompressed code and data segments in conjunction with additional update information to update the firmware and/or software, compressed or otherwise, resident in the electronic devices. An update generator may be adapted to employ compression and decompression techniques to extract compressed code and data segments from a plurality of memory images stored in the electronic devices. The update generator may also be adapted to process the extracted information and generate update packages using the decompressed code and data segments and the additional update information. The update generator may also be adapted to selectively compress the update information in generated update packages usable for updating the electronic devices.

31 Claims, 4 Drawing Sheets

U.S. PATENT DOCUMENTS

| | | | |
|---|---|---|---|
| 5,752,039 A | 5/1998 | Tanimura | 395/712 |
| 5,778,440 A | 7/1998 | Yiu et al. | 711/154 |
| 5,790,974 A | 8/1998 | Tognazzini | 701/204 |
| 5,878,256 A | 3/1999 | Bealkowski et al. | 395/652 |
| 5,903,669 A * | 5/1999 | Hirabayashi | 382/232 |
| 5,913,021 A * | 6/1999 | Masubuchi | 714/15 |
| 5,960,445 A | 9/1999 | Tamori et al. | 707/203 |
| 5,968,182 A | 10/1999 | Chen et al. | |
| 5,974,312 A * | 10/1999 | Hayes et al. | 455/419 |
| 5,983,289 A * | 11/1999 | Ishikawa et al. | 710/35 |
| 6,009,497 A | 12/1999 | Wells et al. | 711/103 |
| 6,018,747 A | 1/2000 | Burns et al. | |
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,104,506 A * | 8/2000 | Hirokawa | 358/444 |
| 6,105,063 A | 8/2000 | Hayes, Jr. | 709/223 |
| 6,112,024 A | 8/2000 | Almond et al. | 395/712 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,138,249 A | 10/2000 | Nolet | |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,199,204 B1 | 3/2001 | Donohue | |
| 6,209,127 B1 | 3/2001 | Mori et al. | |
| 6,279,153 B1 | 8/2001 | Bi et al. | 717/11 |
| 6,301,710 B1 | 10/2001 | Fujiwara | |
| 6,311,322 B1 | 10/2001 | Ikeda et al. | 717/1 |
| 6,334,212 B1 | 12/2001 | Nakajima | |
| 6,343,379 B1 | 1/2002 | Ozawa et al. | |
| 6,381,740 B1 | 4/2002 | Miller et al. | |
| 6,408,434 B1 | 6/2002 | Fujiwara | |
| 6,434,695 B1 * | 8/2002 | Esfahani et al. | 713/2 |
| 6,438,585 B2 | 8/2002 | Mousseau et al. | 709/206 |
| 6,442,358 B1 * | 8/2002 | Regelsberger et al. | 399/85 |
| 6,452,602 B1 * | 9/2002 | Morein | 345/555 |
| 6,467,087 B1 * | 10/2002 | Yang | 717/168 |
| 6,526,574 B1 | 2/2003 | Jones | |
| 6,615,038 B1 | 9/2003 | Moles et al. | |
| 6,615,404 B1 | 9/2003 | Garfunkel et al. | |
| 6,647,480 B1 * | 11/2003 | Bolan et al. | 711/170 |
| 6,668,336 B2 | 12/2003 | Lasser | |
| 6,725,056 B1 | 4/2004 | Moles et al. | |
| 6,725,392 B1 | 4/2004 | Frey et al. | |
| 6,832,373 B2 | 12/2004 | O'Neill | |
| 6,836,657 B2 | 12/2004 | Ji et al. | |
| 6,845,434 B2 * | 1/2005 | Lin | 711/162 |
| 6,892,207 B2 * | 5/2005 | McKay et al. | 707/101 |
| 6,907,478 B2 * | 6/2005 | Li et al. | 710/33 |
| 6,925,467 B2 | 8/2005 | Gu et al. | |
| 6,928,108 B2 | 8/2005 | Nelson et al. | |
| 6,970,917 B1 | 11/2005 | Kushwaha et al. | |
| 6,988,182 B2 * | 1/2006 | Teachman et al. | 712/37 |
| 7,082,549 B2 * | 7/2006 | Rao et al. | 714/6 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0069259 A1 | 6/2002 | Kushwaha et al. | |
| 2002/0072359 A1 | 6/2002 | Moles et al. | |
| 2002/0078209 A1 | 6/2002 | Peng | 709/227 |
| 2002/0112046 A1 | 8/2002 | Kuchwaha et al. | |
| 2002/0112047 A1 | 8/2002 | Kuchwaha et al. | |
| 2002/0116261 A1 | 8/2002 | Moskowitz et al. | 705/14 |
| 2002/0131404 A1 | 9/2002 | Mehta et al. | 370/352 |
| 2002/0144005 A1 * | 10/2002 | Mae et al. | 709/310 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0023964 A1 | 1/2003 | Rajaram et al. | |
| 2003/0027563 A1 | 2/2003 | Herle et al. | |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0074658 A1 | 4/2003 | Kim | |
| 2003/0084435 A1 | 5/2003 | Messer et al. | |
| 2003/0095648 A1 * | 5/2003 | Kaib et al. | 379/106.02 |
| 2003/0121032 A1 | 6/2003 | Cho et al. | |
| 2003/0162533 A1 | 8/2003 | Moles et al. | |
| 2003/0186689 A1 | 10/2003 | Herle et al. | |
| 2003/0198292 A1 * | 10/2003 | Gold | 375/240.01 |
| 2004/0015952 A1 | 1/2004 | Lajoie et al. | |
| 2004/0031031 A1 | 2/2004 | Rudelic | |
| 2004/0034853 A1 | 2/2004 | Gibbons et al. | |
| 2004/0054995 A1 | 3/2004 | Lee | |
| 2004/0111723 A1 | 6/2004 | Moles et al. | |
| 2004/0117785 A1 | 6/2004 | Kincaid | |
| 2004/0133887 A1 | 7/2004 | Herle et al. | |
| 2004/0152455 A1 | 8/2004 | Herle | |
| 2004/0210608 A1 * | 10/2004 | Lee et al. | 707/204 |
| 2004/0250294 A1 * | 12/2004 | Kim | 725/135 |
| 2004/0261072 A1 | 12/2004 | Herle | |
| 2004/0261073 A1 | 12/2004 | Herle et al. | |
| 2005/0060699 A1 | 3/2005 | Kim et al. | |
| 2005/0097544 A1 | 5/2005 | Kim | |
| 2005/0138232 A1 * | 6/2005 | Tamura et al. | 710/22 |
| 2005/0144609 A1 | 6/2005 | Rothman et al. | |
| 2005/0144612 A1 | 6/2005 | Wang et al. | |
| 2005/0160195 A1 | 7/2005 | Bruner et al. | |
| 2005/0216902 A1 | 9/2005 | Schaefer | |
| 2005/0216903 A1 | 9/2005 | Schaefer | |
| 2006/0190939 A1 * | 8/2006 | Chen et al. | 717/168 |

FOREIGN PATENT DOCUMENTS

| | | |
|---|---|---|
| EP | 0717353 A2 | 6/1996 |
| JP | 7-160490 | 6/1995 |
| JP | 7-219780 | 8/1995 |
| JP | 8202626 | 8/1996 |
| JP | 8-255104 | 10/1996 |
| JP | 11-003223 | 1/1999 |
| JP | 11-272454 | 10/1999 |
| JP | 11-345127 | 12/1999 |
| KR | 2002-0034228 | 5/2000 |
| KR | 2001-0100328 | 11/2001 |

OTHER PUBLICATIONS

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the $1^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

Computer Dictionary Microsoft Press Third Edition, pp. 88, 190, 1997.

"Notice of Reasons for Rejection", Japanese Office Action Reference No. B027803, Mailing No. 415807, Mailing Date Nov. 8, 2005 for Patent Application No. 2002-543291, with English Translation, pp. 1-13.

"Transcript of Decision of Final Rejection", Japanese Office Action Reference No. B027803, Mailing No. 236268, Mailing Date Jun. 6, 2006 for Patent Application No. 2002-543291, with English Translation, pp. 1-10.

* cited by examiner

ELECTRONIC DEVICE NETWORK SUPPORTING COMPRESSION AND DECOMPRESSION IN ELECTRONIC DEVICES

CROSS-REFERENCE TO RELATED APPLICATIONS

The present application makes reference to, claims priority to, and the benefit of U.S. Provisional Patent Application 60/523,402 entitled "MOBILE HANDSET NETWORK WITH SUPPORT FOR COMPRESSION AND DECOMPRESSION IN THE MOBILE HANDSET", filed Nov. 19, 2003, the complete subject matter of which is hereby incorporated herein by reference in its entirety.

The present application makes reference to U.S. Provisional Patent Application 60/491,831 entitled "MOBILE HANDSET NETWORK WITH SUPPORT FOR COMPRESSION AND DECOMPRESSION IN THE MOBILE HANDSET AND GENERATOR", filed Jul. 31, 2003, the complete subject matter of which is hereby incorporated herein by reference in its entirety.

The present application also hereby incorporates herein by reference in its entirety, the complete subject matter of PCT Application having publication number WO 02/41147 A1 and PCT application number PCT/US01/44034, filed on Nov. 19, 2001.

The present application also hereby incorporates herein by reference in its entirety, the complete subject matter of U.S. Provisional Patent Application 60/249,606 filed on Nov. 17, 2000.

The present application also hereby incorporates herein by reference in its entirety, the complete subject matter of U.S. Provisional Patent Application 60/422,048, filed Oct. 29, 2002.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and/or application software that are either provided by the manufacturers of the electronic devices, by telecommunication carriers, or by third parties. These firmware and application software often contain bugs. New versions of firmware and software are periodically released to fix the bugs and/or to introduce new features.

Generating update packages in an efficient mode when at least a portion of the firmware and/or software to be updated is compressed and/or encrypted is a complex and challenging process. Updating code in electronic devices when the code to be updated is compressed and/or encrypted is also a challenging task.

Update programs, code, or functions employed to update the firmware and/or software components in electronic devices may also need to be changed, modified, and/or updated. However, portions or blocks of the information being updated may not fit into the memory available in the electronic device during an update. Changes to firmware and/or software components may need to be performed in a fault tolerant mode, however a fault tolerant update may be difficult to implement.

Electronic devices may employ non-volatile memory to store code and/or data. Sometimes, more than one type of memory device may be employed. Updating code and/or data distributed across multiple memory devices and memory device types may be difficult, especially, if the memory devices are produced by different manufacturers.

Further limitations and disadvantages of conventional and traditional approaches will become apparent to one of ordinary skill in the art through comparison of such systems with the present invention as set forth in the remainder of the present application with reference to the drawings.

SUMMARY OF THE INVENTION

Aspects of the present invention may be found in a method of updating compressed information in an electronic device. The method may comprise decompressing at least one block of information to be updated, updating at least a portion of decompressed contents of the at least one block of information, and compressing the updated contents of the at least one block of information.

In an embodiment according to the present invention, the method may further comprise retrieving and updating one block at a time.

In an embodiment according to the present invention, the method may further comprise retrieving a plurality of blocks and updating one block at a time.

In an embodiment according to the present invention, the method may further comprise backing up the at least one block of information during an update.

In an embodiment according to the present invention, backing up the at least one block of information may comprise storing a compressed version of the at least block of information being updated.

In an embodiment according to the present invention, backing up the at least one block of information may comprise storing a decompressed updated version of the at least one block of information.

In an embodiment according to the present invention, updating at least a portion of decompressed contents of the at least one block of information may comprise overwriting at least a portion of the contents of the at least one block of information with updated information.

In an embodiment according to the present invention, updating at least a portion of decompressed contents of the at least one block of information may comprise modifying at least a portion of the contents of the at least one block of information with updated information.

In an embodiment according to the present invention, updating at least a portion of decompressed contents of the at least one block of information may comprise using a set of executable instructions to convert the at least a portion of decompressed contents to an updated contents.

In an embodiment according to the present invention, decompressing at least one block of information to be updated may comprise adjusting one of a size or length of the block of information during decompression.

In an embodiment according to the present invention, compressing the updated contents of the at least one block of information may comprise adjusting one of a size or length of the block of information during compression.

Aspects of the present invention may be found in a method of fault tolerant updating of compressed information in an electronic device. The method may comprise decompressing contents of at least one block of information to be updated, temporarily storing the at least one block of information, and compressing contents the at least one block of information after the contents have been updated.

In an embodiment according to the present invention, temporarily storing the at least one block of information may comprise storing the at least one block of information in compressed form before being updated.

In an embodiment according to the present invention, temporarily storing the at least one block of information may comprise storing the at least one block of information after contents of the at least one block of information have been updated.

In an embodiment according to the present invention, the method may further comprise updating at least a portion of one block of information one block at a time.

In an embodiment according to the present invention, updating at least a portion of one block of information may comprise updating decompressed contents of the at least one block of information by overwriting at least a portion of the decompressed contents of the at least one block of information with updated information.

In an embodiment according to the present invention, updating at least a portion of one block of information may comprise updating decompressed contents of the at least one block of information by modifying at least a portion of the decompressed contents of the at least one block of information with updated information.

In an embodiment according to the present invention, updating at least a portion of one block of information comprises updating decompressed contents of the at least one block of information by converting at least a portion of decompressed contents of the at least one block of information to an updated contents using a set of executable instructions.

In an embodiment according to the present invention, decompressing at least one block of information to be updated may comprise adjusting one of a size or length of the block of information during decompression.

In an embodiment according to the present invention, compressing the updated contents of the at least one block of information may comprise adjusting one of a size or length of the block of information during compression.

Aspects of the present invention may be found in a system for updating compressed information. The system may comprise at least one electronic device comprising compressed information and an update generator for generating updates for updating the compressed information resident in the at least one electronic device in a fault tolerant manner.

In an embodiment according to the present invention, the electronic device may comprise a compressed section of non-volatile memory. The compressed section may comprise at least one of compressed data and compressed code.

In an embodiment according to the present invention, the electronic device may comprise one of a unitary decompression/compression engine and a separate decompression engine and a separate compression engine.

In an embodiment according to the present invention, the electronic device may comprise a back-up non-volatile storage for ensuring continuity of an update procedure and preventing loss of information. At least one block of information may be stored in the back-up non-volatile storage during the update procedure.

In an embodiment according to the present invention, the electronic device may comprise random access memory for performing an update on decompressed blocks of information.

In an embodiment according to the present invention, the electronic device may comprise a non-volatile memory adapted to contain blocks of information comprising one of a uniform size and a uniform length.

In an embodiment according to the present invention, the electronic device may comprise a random access memory adapted to contain blocks of information comprising one of a variable size and a variable length.

In an embodiment according to the present invention, the electronic device comprises one of a unitary ciphering/deciphering engine and a separate ciphering engine and a separate deciphering engine.

These and other advantages, aspects, and novel features of the present invention, as well as details of illustrated embodiments, thereof, will be more fully understood from the following description and drawings.

DETAILED DESCRIPTION OF THE INVENTION

Figure 1:
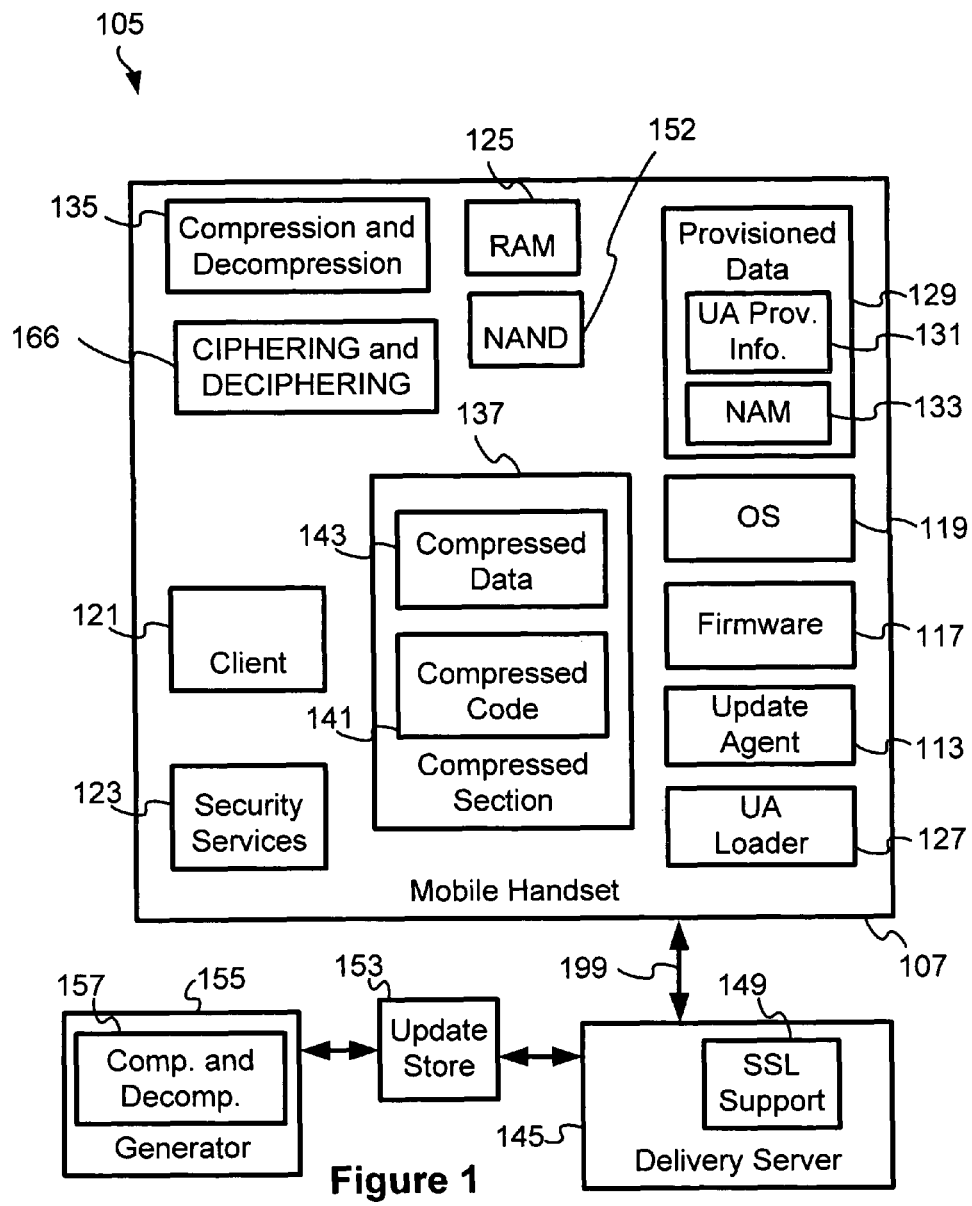
FIG. 1 is a block diagram illustrating an electronic device network adapted to employ compression and decompression techniques during an update of partially or totally compressed firmware and/or software components in electronic devices in accordance with an embodiment of the present invention.

Electronic devices may be adapted to access servers to retrieve update information for updating electronic devices. An electronic device may be, for example, a mobile electronic device having software/firmware, such as, mobile cellular phone handsets, personal digital assistants (PDA's), pagers, MP3 players, digital cameras, etc. Update information may comprise information that modifies or changes firmware and/or software components installed in the electronic device. Update information may also add new services to the electronic device, as desired by a service provider, device manufacturer, or an end-user.

Aspects of the present invention may be found in a fault tolerant method of updating a compressed information file. The compressed information file may be stored in compressed form in a non-volatile memory device, for example, a flash memory device. The compressed information file may comprise code and/or data. The memory may be erased before reprogramming. The memory may be overwritten, without being erased, during updating and/or reprogramming.

In an embodiment according to the present invention, a fault tolerant method may comprise preventing loss of information, in the event that power failure occurs, during a reprogramming event. In an embodiment according to the present invention, a fault tolerant method may comprise ensuring continuity of an updating and/or reprogramming procedure, in the event that power failure occurs, during the updating and/or reprogramming procedure.

Information, residing in the electronic devices to be updated, may comprise code and/or data. The code and/or data may be organized/arranged in units or blocks of information. The blocks of information may also be called compressed units/blocks and update units/blocks herein. In an embodiment according to the present invention, the size of a particular memory block in non-volatile memory may be fixed and may be a parameter of a manufacturer's hardware configuration of an electronic device. In an embodiment according to the present invention, the size of a particular memory block usable for updating may be variable according to the demands placed upon the memory during a processing event.

In an embodiment according to the present invention, a compressed unit/block may comprise a set of compressed code/data. In an embodiment according to the present invention, compression and decompression of the code/data may be performed independently, for example, one block or unit at a time. In an embodiment according to the present invention, several or all of the blocks may be compressed and decompressed simultaneously. The size of a compressed unit/block may be arranged according to particular electronic device memory constraints. The electronic device memory may be arranged as a single block of memory or a plurality of memory sub-blocks.

In an embodiment according to the present invention, an update unit/block may comprise a logical block of memory in random access memory (RAM). When a compressed unit/block is decompressed from non-volatile memory (NVM) into RAM, the block may be designated an update unit/block because the decompressed block may be changed, modified, overwritten, and/or updated.

In an embodiment according to the present invention, an update generator may be adapted to generate an update unit/block or a set comprising a plurality of update unit/blocks for use in updating one of firmware and/or software in electronic devices. Each update unit/block may have the same or a different size or length, i.e., the amount of decompressed information resident in each update unit/block may vary from block to block. Each compressed block may comprise a uniform length. Each update unit/block may have a variable size or length.

An update package may comprise a firmware/software update that may be used to modify or change a version of a particular firmware/software, for example, upgrading to a newer version. The information in the update package may comprise, for example, a set of executable instructions for converting a first version of firmware/software ("code") to a second version of code. In an embodiment according to the present invention, an update package may also add new services to the electronic device or delete services, as desired by the service provider or an end-user. An update package may also be referred to in abbreviated form herein as an update.

In an embodiment according to the present invention, the electronic device may comprise an update generator. The update generator may be adapted to process (i.e., update) update units/blocks. In an embodiment according to the present invention, updating update units/blocks may comprise overwriting the decompressed information resident in the update units/blocks with new or different (updated) information.

In an embodiment according to the present invention, the update generator may be adapted to process (i.e., update) update units/blocks comprising a plurality of non-uniform (i.e., variable) sizes. The ability of the update generator to process (i.e., update) update units/blocks is not hampered by update units/blocks comprising variable amounts of decompressed information (i.e., those having variable size or length).

In an embodiment according to the present invention, the update generator may also be adapted to determine different split boundaries between individual update units/blocks. For example, a different split boundary may be employed after the update units/blocks have been updated in order to permit the variable-sized updated blocks to be compressed into blocks of fixed size for storage in the NVM. The size may be fixed in accordance with electronic device specifications or by the non-volatile memory device specifications.

FIG. 1 is a block diagram illustrating an electronic device network, for example, mobile handset network 105, adapted to employ compression and decompression techniques to update partially or totally compressed firmware 117 and/or software in electronic devices, for example, mobile handset 107, in accordance with an embodiment of the present invention.

In FIG. 1, the electronic device network, for example, the mobile handset network 105 may be adapted to employ compression and decompression techniques. The electronic device network, for example, mobile handset network 105 may comprise an update generator 155 capable of generating updates that may be employed to update firmware 117 and/or software components in electronic devices, for example, mobile handset 107. The update generator 155 may comprise a combined compression and decompression engine 157. In an embodiment according to the present invention, the update generator 155 may also comprise a separate compression engine and a separate decompression engine.

The electronic device network, for example, mobile handset network 105, may also comprise an update store 153 operatively connected to the update generator 155. The update store 153 may be adapted to serve as a repository for one or a plurality of partially or wholly generated updates. The electronic device network, for example, mobile handset network 105, may also comprise a delivery server 145 adapted to dispense generated updates via a communication link 199 to a plurality of electronic devices, for example, mobile handset 107. The delivery server 145 may be operatively connected to the update store 153 and therefore also to the update generator 155 according to an embodiment of the present invention.

The operative connections between update generator 155, the update store 153, and the delivery server 145 illustrated in FIG. 1, are exemplary and other connective arrangements may also be employed. The communications link 199 may, for example, comprise at least one of a wire, a cable, an optical fiber, and a wireless connection, for example. The delivery server 145 may also comprise a secure socket layer (SSL) support engine 149 for ensuring secure communication between the delivery server 145 and a plurality of electronic devices, for example, mobile handset 107.

In an embodiment according to the present invention, an electronic device, for example, mobile handset 107 may be adapted to retrieve generated updates from the delivery server 145 to update firmware 117 and/or software components resident in the electronic device. In an embodiment according to the present invention, at least a portion of firmware 117 and/or software components resident in the electronic device may be compressed and/or encrypted.

In an embodiment according to the present invention, compression algorithms may be installed in the electronic devices, for example, mobile handset 107. The installed compression algorithms may be implemented in hardware in an embodiment according to the present invention. The installed compression algorithms may be implemented in firmware 117 and/or software components in another embodiment according to the present invention.

In an embodiment according to the present invention, the compression algorithms may be employed to decompress compressed code and/or compressed data segments that may be stored in the compressed data section 143 and the compressed code section 141, respectively, in a compressed section 137. The decompressed code and/or data segments may be updated in RAM 125 using updates downloaded or otherwise transferred to the electronic device, for example, mobile handset 107. Once the decompressed code is updated, (e.g., updates may be performed in a fault tolerant mode), the code may be compressed again and stored in non-volatile memory in the electronic device.

In an embodiment according to the present invention, fault tolerant updating of firmware 117 and/or software components comprising compressed code and/or compressed data segments may be conducted in the electronic device, for example, mobile handset 107. A fault tolerant update agent, for example, update agent 113, may be employed to update the firmware 117 and/or software components in electronic devices, for example, mobile handset 107.

In an embodiment according to the present invention, the compression and decompression algorithms may be embedded in a compression engine accessible by the update generator. In an embodiment according to the present invention, the compression engine may comprise a software engine accessible by the update generator.

In an embodiment according to the present invention, electronic devices, for example, mobile handset 107, may comprise compression and decompression components 135, an update download client 121, a security services component 123, and a compressed section 137. The compressed section 137 may at least comprise a compressed data section 143 and a compressed code section 141. The compressed section may comprise non-volatile memory. The electronic devices, for example, mobile handset 107, may also comprise a provisioned data component 129. The provisioned data component 129 may at least comprise an update agent (UA) provisioning information section 131 and a number assignment module (NAM) 133.

In an embodiment according to the present invention, the electronic devices, for example, mobile handset 107 may also comprise an operating system (OS) 119, firmware 117, update agent 113, and an update application (UA) loader 127. The update agent 113 may be capable of employing the compression and decompression components 135 to update the firmware 117 and/or software component in the electronic devices, for example, mobile handset 107.

In an embodiment according to the present invention, at least a portion of the firmware 117 and/or software components may be compressed and reside in the compressed section 137, that may comprise a non-volatile memory. In an embodiment according to the present invention, the update agent 113 may be capable of conducting fault-tolerant updates.

In an embodiment according to the present invention, the update agent 113 may comprise an update core engine (not shown in FIG. 1). In an embodiment according to the present invention, the compressed code stored in compressed code section 141 and the compressed data stored in compressed data section 143 may also be ciphered. The electronic device, for example, mobile handset 107 may also comprise ciphering and deciphering components 166 employable to facilitate updating of firmware 117 and/or software components in the electronic devices. In an embodiment according to the present invention, the information to be updated in an electronic device may be decompressed, deciphered, updated, enciphered, and compressed as part of an update procedure. In an embodiment according to the present invention, the information to be updated may also be decrypted and encrypted as part of an update procedure.

In an embodiment according to the present invention, the update generator 155 may be capable of processing an old memory image and a new memory image of electronic device firmware 117 and/or software components in creating an update. At least a portion of the firmware 117 and/or software components may be compressed employing compression techniques, ciphered employing ciphering techniques, and encrypted employing encryption techniques. At least a portion of the firmware 117 and/or software components may be decompressed employing decompression techniques, deciphered employing deciphering techniques, and decrypted employing decryption techniques. The compression techniques employed in the electronic device network and the electronic devices themselves may comprise, for example, zip, gzip, winzip, LZ compression, etc., for example.

In an embodiment according to the present invention, the compression/decompression engine 157 in update generator 155 may decompress the compressed data and/or compressed code in both the old memory image and the new memory image to generate an update usable to update a current memory image of the electronic devices, for example, mobile handset 107.

In an embodiment according to the present invention, electronic devices, for example, mobile handset 107 may comprise and employ NAND-type non-volatile memory 152 (that may also be referred to as NAND-flash memory) to store data and/or code. The NAND-type non-volatile memory may be used to back up information (as a backup resource) currently being updated to ensure fault tolerant updating, i.e., avoiding loss of information and ensuring continuity of an update in the event a power failure should occur during the update procedure. The stored data and/or code may be decompressed by the compression and decompression component 135 in the electronic device, for example mobile handset 107.

In an embodiment according to the present invention, updating the code/data in the NAND-type memory 152 by update agent 113 may require retrieving components (code and/or data) one block at a time. By backing up a single block of information (code and/or data) at a time, continuity of an update in the event of a power failure during the update may be ensured. Additionally, by backing up a single block of information (code and/or data) at a time, loss of information may be avoided. In an embodiment according to the present invention, the retrieved components may also be decompressed one block at a time during retrieval.

In an embodiment according to the present invention, a block of code/data in the NAND-type memory 152 may be decompressed to restore the code/data in the blocks while updating a current block in RAM 125. In an embodiment according to the present invention, the current block in the RAM 125 may be updated in fault tolerant mode. In an embodiment according to the present invention, the updated block may be written back into the NAND-type memory 152 for subsequent restoration.

In an embodiment according to the present invention, a working bank of memory in the RAM 125 may be expanded beyond one block in length. A decompressed current block from the NAND-type memory 152 may occupy more than one block in RAM 125. After update completion, the decompressed code/data in the working block may be written back into the current block in NAND-type memory 152.

Figure 2:
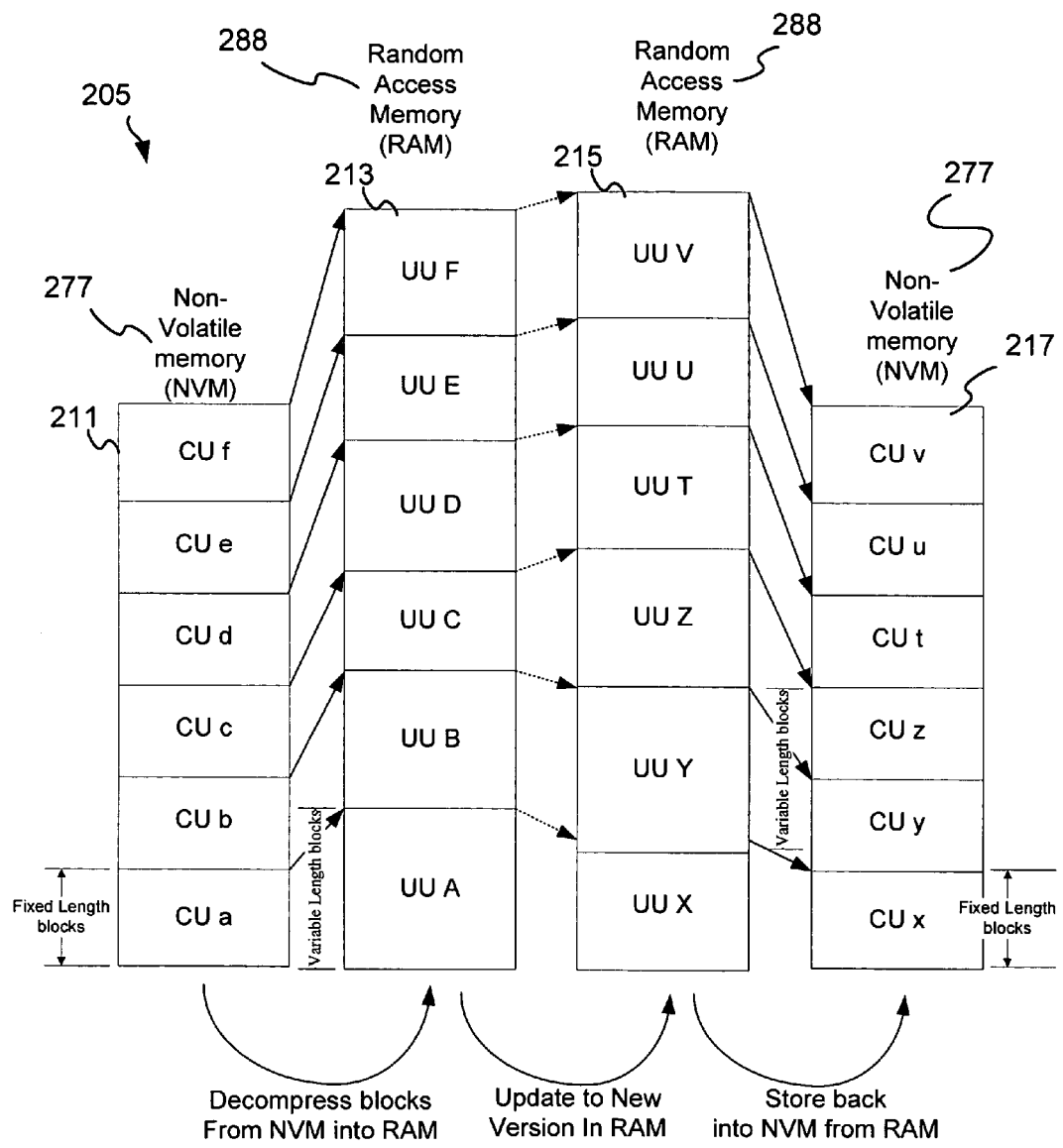
FIG. 2 is a block diagram illustrating a method of updating compressed firmware and/or software components residing in non-volatile memory in an electronic device in accordance with an embodiment of the present invention.

FIG. 2 is a block diagram 205 illustrating a method of updating compressed firmware and/or software components in an electronic device, for example, the mobile handset 107 illustrated in FIG. 1, in accordance with an embodiment of the present invention.

FIG. 2 illustrates a plurality of compressed blocks 211 (for example, CU a, CU b, CU c, . . . , CU f) of code/data to be updated, that are resident in non-volatile memory (NVM) 277. The compressed blocks 211 may be decompressed from the NVM 277 into RAM 288 in the electronic device, for example, the mobile handset 107 illustrated in FIG. 1, creating a plurality of update blocks 213 (for example, UU A, UU B, UU C, . . . , and UU F) of code/data.

An update agent, for example, update agent 113 illustrated in FIG. 1, resident in the electronic device may update the plurality of update blocks 213 in RAM 288 by employing one or more of a plurality of updates and creating a plurality of updated blocks 215 in the RAM 288.

In an embodiment according to the present invention, the plurality of update blocks 213 of code/data may be updated to create the plurality of updated blocks 215 of code/data, one block at a time. In another embodiment according to the present invention, all of the plurality of update blocks 213 of code/data may be simultaneously updated by a plurality of updates, creating the plurality of updated blocks 215 of code/data. After update completion, the updated blocks 215 of code/data may be compressed into second compressed units 217 (for example, CU x, CU a, . . . , CU f) and may be copied into non-volatile memory 277.

In an embodiment according to the present invention, an update generator, for example, update generator 155 illustrated in FIG. 1, may be used to generate the update packages used to update the information in update blocks 213. In an embodiment according to the present invention, an update core engine may also be employed in the electronic device for carrying out the updates. In an embodiment according to the present invention, the update core engine may be a component of an update agent, for example, update agent 113 illustrated in FIG. 1. In an embodiment according to the present invention, the update core engine may be adapted to update firmware and/or software one block at a time.

Figure 3:
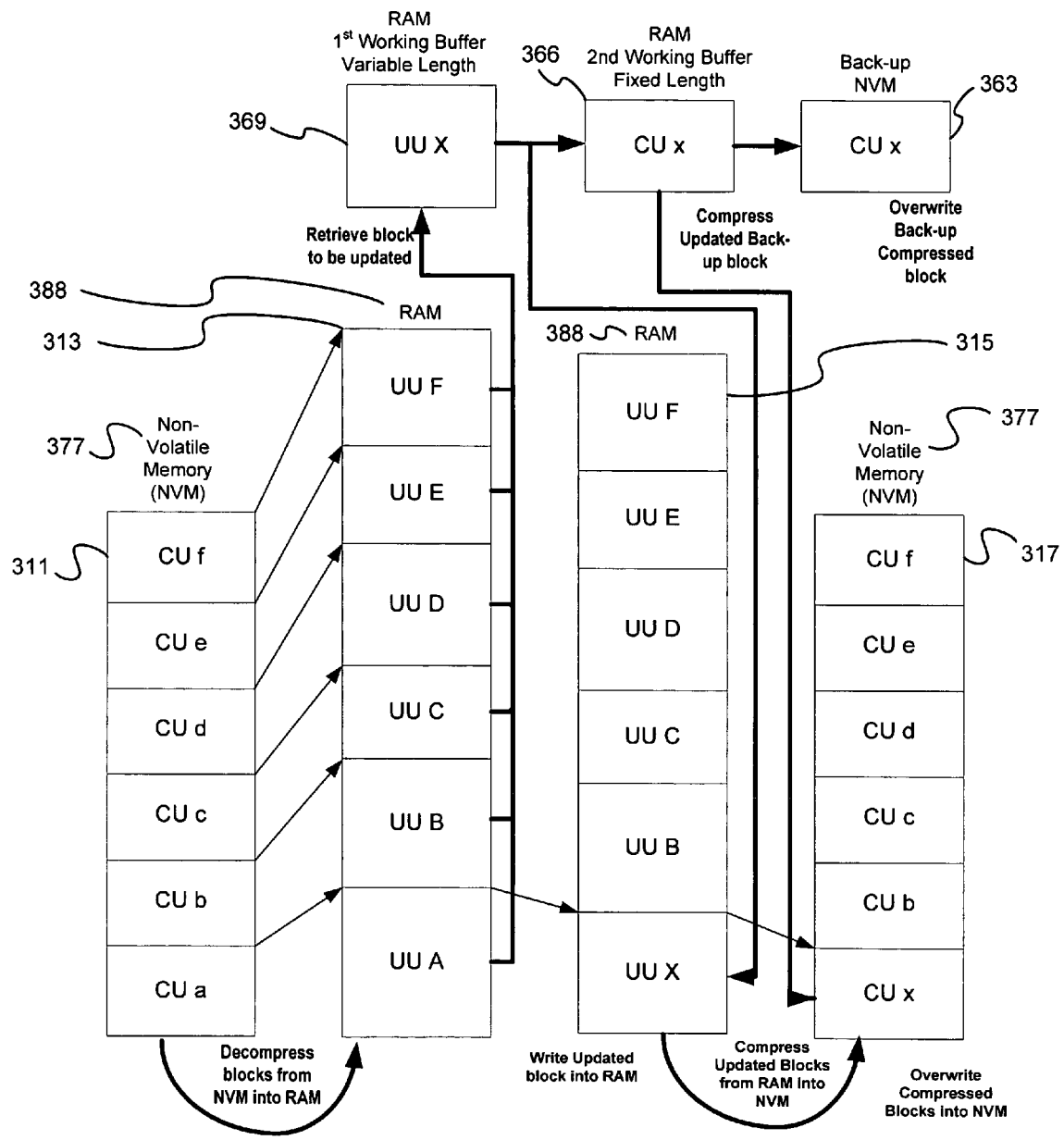
FIG. 3 is a block diagram illustrating a method of preventing loss of information and ensuring continuity of an update procedure by storing updated memory blocks in a fault tolerant manner during an update of firmware and/or software components in an electronic device in accordance with an embodiment of the present invention.

FIG. 3 is a diagram illustrating a method preventing loss of information by storing updated memory blocks in a fault tolerant manner during an update of one of firmware and/or software components in an electronic device, in accordance with an embodiment of the present invention. FIG. 3 illustrates a fault tolerant update information back-up procedure.

In an embodiment according to the present invention, firmware and/or software components resident in electronic devices may be updated. In prior art electronic devices, when/if a power failure occurs during an update of an electronic device, the potential exists for information (code/data) to be lost or misplaced in the electronic device. Information residing in RAM, for example, may be particularly vulnerable because information in RAM is lost when power to the RAM is interrupted. Information residing in a non-volatile memory when/if a power failure occurs may be safely retained. However, upon power-up, the electronic device may not be able to locate, properly address, and/or identify the stored information, rendering the stored information unusable. The loss of information during an update may damage the electronic device and/or render the electronic device inoperable. In an embodiment according to the present invention, loss of update information may be prevented, by employing the fault tolerant updating method set forth herein.

Referring to FIG. 3, compressed blocks 311 (for example, CU a, CU b, CU c, . . . , CU f) of code/data residing in non-volatile memory 377 (NVM) may be decompressed from the NVM 377 to RAM 388. The compressed blocks 311 may be uniform in length. The RAM 388 may comprise a plurality of decompressed update blocks 313 (for example, UU A, UU B, UU C, . . . , UU F). The decompressed update blocks 313 may comprise various lengths.

The decompressed blocks 313 may be retrieved, for example, one block at a time, from the RAM 388 and placed in a first working buffer 369 of variable length. In the first working buffer 369, the update block 313 may be updated. In an embodiment according to the present invention, updating may comprise overwriting/modifying the entire contents of the update block 313 in the first working buffer 369 with different/updated information. In an embodiment according to the present invention, updating may comprise overwriting a portion of the contents of the update block 313 in the first working buffer 369 with different/updated information.

After the update block 313 has been updated, a back-up copy of the updated block may be compressed from the first working buffer 369 to a second working buffer 366. The first working buffer 369 may comprise blocks having varying lengths to facilitate updating. The second working buffer 366 may comprise blocks having uniform lengths corresponding to the uniform length of blocks in the non-volatile memory device, for example, NVM 377. The contents of the first working buffer 369 may be compressed into the second working buffer 366, and subsequently into the back-up NVM 363. By saving the compressed update block in the back-up NVM 363, should a power failure occur, the electronic device, upon re-boot and restart, may continue the update without loss of information and/or continuity. The update may resume where the update was abruptly interrupted by the power failure.

The updated block 315 may also be compressed from the first working buffer 369 into RAM 388. The updated block 315 may also be stored in NVM 377. A previous block, for example block 317 in NVM 377 may be overwritten with the compressed updated block of information.

Figure 4:
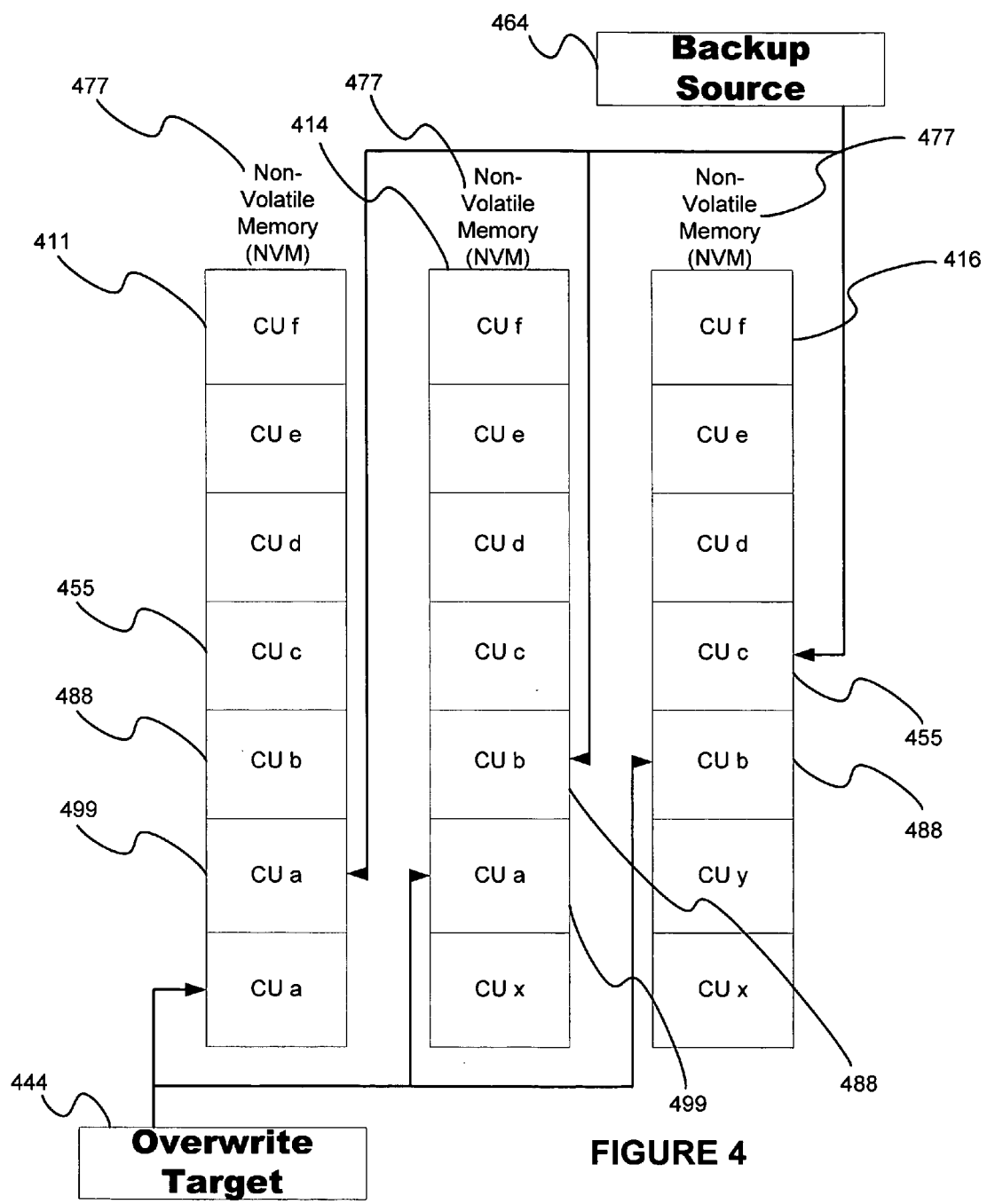
FIG. 4 is a diagram illustrating a method of preventing loss of information and ensuring continuity of an update procedure by backing up and overwriting at least one compressed block of information during an update of an electronic device in accordance with an embodiment of the present invention.

FIG. 4 is a diagram illustrating a method of backing up a block of information during an update of an electronic device, for example, the mobile handset 107 illustrated in FIG. 1, in accordance with an embodiment of the present invention. FIG. 4 illustrates a non-volatile memory device 477 (NVM) comprising a plurality of memory blocks 411, 414, and 416 (labeled for example, CU a, CU b, CU c, . . . , CU f). FIG. 4 also illustrates a backup source 464 (non-volatile memory) memory location and an overwrite target 444 memory location.

Aspects of the present invention may be found in avoiding loss of information and ensuring continuity of an update procedure when performing updates of firmware and/or software components in electronic devices by backing up an updated block of information in a fault tolerant manner. Updates may be performed on update blocks, for example, 499, 488, and 455, and each update block may be updated independent of other update blocks, i.e., each update block may receive different update information than any other update block. An update block, for example, 499, 488, and 455, may be reconstructed, in the event of update interruption due to a power failure, for example, by evaluating the stored corresponding compressed block stored in backup source 464, for example, or by evaluating information stored where the update block originated (for example, in non-volatile memory).

Storing (backing-up) a compressed block corresponding to a current working update block during the update procedure in backup source 464, for example, may ensure that loss of information is avoided. Therefore, a fault tolerant update may comprise safeguarding update information (the compressed block stored in backup source 464) so that a current working block (the block being updated) may be reconstructed should a power failure occur during the update.

Aspects of the present invention may be found in a method of performing a fault tolerant update on an information file (e.g., code/data) in an electronic device. In an embodiment according to the present invention, an information file (i.e., block of information) may be stored in compressed form in non-volatile memory 477, for example, in an electronic device while the decompressed information file (i.e., block of information) is being updated in RAM, for example, RAM 388 illustrated in FIG. 3, during an electronic device update procedure.

In an embodiment according to the present invention, when a compressed block of information is decompressed out of NVM 411 into RAM, for example, RAM 388 illustrated in FIG. 3, a compressed version of the same block may also be written (stored) in a particular, but temporary, non-volatile memory location, for example, backup source 464, for easy reference during a restart or reboot after a power failure or other update interruption. As each block is subsequently processed, the compressed version of the current working block may be overwritten into an overwrite target 444, for example, block CU a, illustrated in FIG. 4.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of updating compressed information in an electronic device, the method comprising:

decompressing one of at least one block of information to be updated;

after decompressing, updating at least a portion of decompressed contents of the one of the at least one block of information, using update information received by the electronic device;

after updating, compressing an amount of the updated decompressed contents of the one of the at least one block of information, wherein the amount to be compressed is predetermined by a generator of the update information external to the electronic device;

after compressing, storing the compressed updated decompressed contents in the one or another of the at least one block of information; and repeating the decompressing, updating, compressing, and storing in a block by block fashion until each block in the at least one block of information has been updated.

2. The method according to claim 1, further comprising retrieving and updating one block at a time.

3. The method according to claim 1, further comprising retrieving a plurality of blocks and updating one block at a time.

4. The method according to claim 1, further comprising storing a duplicate copy of the one of the at least one block of information during an update.

5. The method according to claim 4, wherein storing the duplicate copy of the one of the at least one block of information comprises storing a compressed version of the one of the at least one block of information.

6. The method according to claim 4, wherein storing the backup copy of the one of the at least one block of information comprises storing the updated decompressed contents of the one of the at least one block of information.

7. The method according to claim 1, wherein updating at least a portion of decompressed contents of the one of the at least one block of information comprises overwriting at least a portion of the decompressed contents of the one of the at least one block of information with updated information.

8. The method according to claim 1, wherein updating at least a portion of decompressed contents of the one of the at least one block of information comprises modifying at least a portion of the decompressed contents of the one of the at least one block of information with updated information.

9. The method according to claim 1, wherein updating at least a portion of decompressed contents of the one of the at least one block of information comprises using a set of executable instructions to convert the at least a portion of decompressed contents to an updated contents.

10. The method according to claim 1, wherein decompressing the one of the at least one block of information to be updated comprises adjusting one of a size and length of the block of information during decompression.

11. The method according to claim 1, wherein compressing the updated contents of the one of the at least one block of information comprises adjusting one of a size and length of the block of information during compression.

12. A method of fault tolerant updating of compressed information in an electronic device, the method comprising:

decompressing contents of at least one block of information to be updated;

temporarily storing in non-volatile memory a duplicate copy of the at least one block of information;

after decompressing, compressing a predetermined amount of the updated contents of the at least one block of information, after the contents have been updated using update information received by the electronic device from a remote source;

after compressing, storing the compressed updated contents in the at least one block of information;

repeating the decompressing, temporarily storing, compressing, and storing after compression until all of the at least one block of information have been updated; and wherein the update information communicates the predetermined amount of the updated decompressed contents to be compressed for each of the at least one block to be updated, and comprises information enabling the electronic device to resume updating the compressed information at a point of abnormal interruption of the updating.

13. The method according to claim 12, wherein temporarily storing the duplicate copy of the at least one block of information comprises storing the at least one block of information in compressed form before being updated.

14. The method according to claim 12, wherein temporarily storing the duplicate copy of the at least one block of information comprises storing the at least one block of information after contents of the at least one block of information have been updated.

15. The method according to claim 12, further comprising updating at least a portion of one block of information at a time.

16. The method according to claim 15, wherein updating at least a portion of one block of information comprises updating decompressed contents of the at least one block of information by overwriting at least a portion of the decompressed contents of the at least one block of information with updated information.

17. The method according to claim 15, wherein updating at least a portion of one block of information comprises updating decompressed contents of the at least one block of information by modifying at least a portion of the decompressed contents of the at least one block of information with updated information.

18. The method according to claim 15, wherein updating at least a portion of one block of information comprises updating decompressed contents of the at least one block of information by converting at least a portion of decompressed contents of the at least one block of information to an updated contents using a set of executable instructions.

19. The method according to claim 12, wherein decompressing at least one block of information to be updated comprises adjusting one of a size and length of the block of information during decompression.

20. The method according to claim 12, wherein compressing the updated contents of the at least one block of information comprises adjusting one of a size and length of the block of information during compression.

21. A system for updating compressed information, the system comprising:

at least one electronic device comprising compressed information; and an update generator remote from the electronic device for generating updates for updating the compressed information resident in the at least one electronic device in a fault tolerant manner, the generated updates comprising information identifying an amount of updated decompressed information to be compressed to form each block of updated compressed information, and information that enables the at least one electronic device to resume updating the compressed information at a point of interruption of the updating.

22. The system according to claim 21, wherein the electronic device comprises a compressed section of non-volatile memory comprising compressed code.

23. The system according to claim 21, wherein the electronic device comprises one of a unitary decompression/compression engine and a separate decompression engine and a separate compression engine.

24. The system according to claim 21, wherein the electronic device comprises a hack-up non-volatile storage for ensuring continuity of an update procedure and preventing loss of information, wherein at least one duplicate block of information is stored in the hack-up non-volatile storage only during the update procedure.

25. The system according to claim 21, wherein the electronic device comprises random access memory for performing an update on decompressed blocks of information.

26. The system according to claim 21, wherein the electronic device comprises a non-volatile memory adapted to contain blocks of information comprising one of a uniform size and a uniform length.

27. The system according to claim 21, wherein the electronic device comprises a random access memory adapted to contain blocks of information comprising one of a variable size and a variable length.

28. The system according to claim 21, wherein the electronic device comprises one of a unitary ciphering/deciphering engine and a separate ciphering engine and a separate deciphering engine.

29. The method according to claim 1, wherein the compressed information comprises executable code installed in the electronic device and the updating comprises reprogramming the electronic device.

30. The method according to claim 5, wherein the compressed version is the one of the at least one block of information before the updating.

31. The method according to claim 5, wherein the compressed version is the one of the at least one block of information after the updating.

* * * * *

UNITED STATES PATENT AND TRADEMARK OFFICE
CERTIFICATE OF CORRECTION

| | |
|---|---|
| PATENT NO. | : 7,886,093 B1 |
| APPLICATION NO. | : 10/903394 |
| DATED | : February 8, 2011 |
| INVENTOR(S) | : Shao-Chun Chen |

It is certified that error appears in the above-identified patent and that said Letters Patent is hereby corrected as shown below:

In column 14, line 21, in Claim 24, delete "hack-up" and insert -- back-up --, therefor.

In column 14, line 24, in Claim 24, delete "hack-up" and insert -- back-up --, therefor.

Signed and Sealed this
Tenth Day of May, 2011

David J. Kappos
*Director of the United States Patent and Trademark Office*